H. T. LARSON.
CLEVIS.
APPLICATION FILED JUNE 15, 1921. RENEWED AUG. 19, 1922.
1,434,296.
Patented Oct. 31, 1922.
2 SHEETS—SHEET 1.
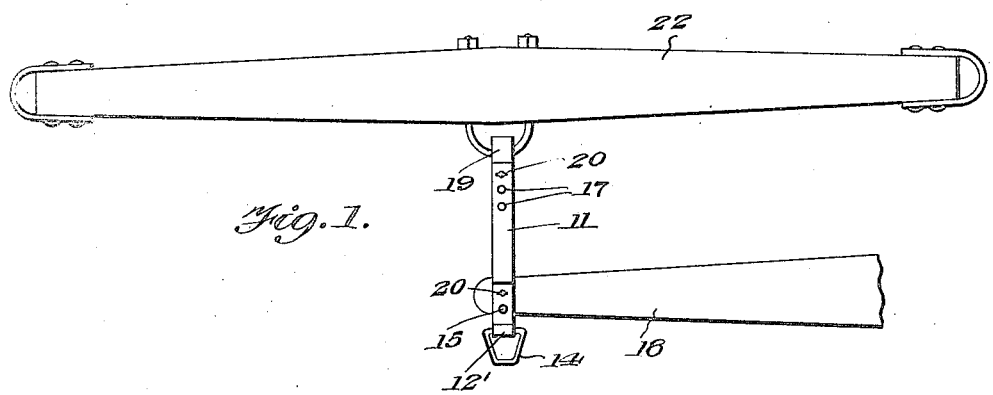
Fig. 1.
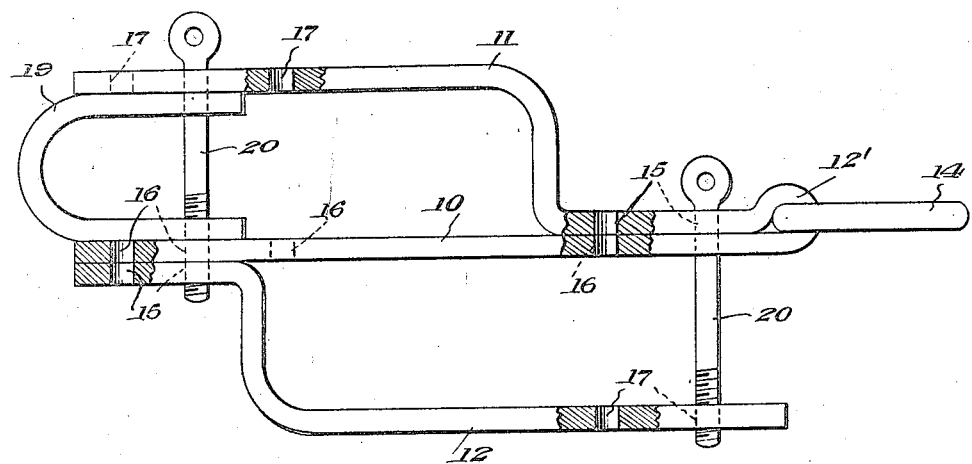
Fig. 2.
Fig. 6.
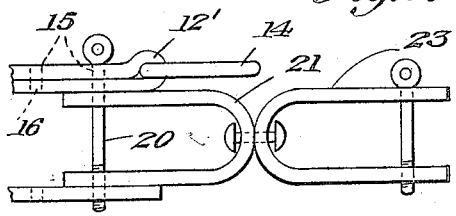
Henry T. Larson
INVENTOR
BY Victor J. Evans
ATTORNEY
WITNESS:

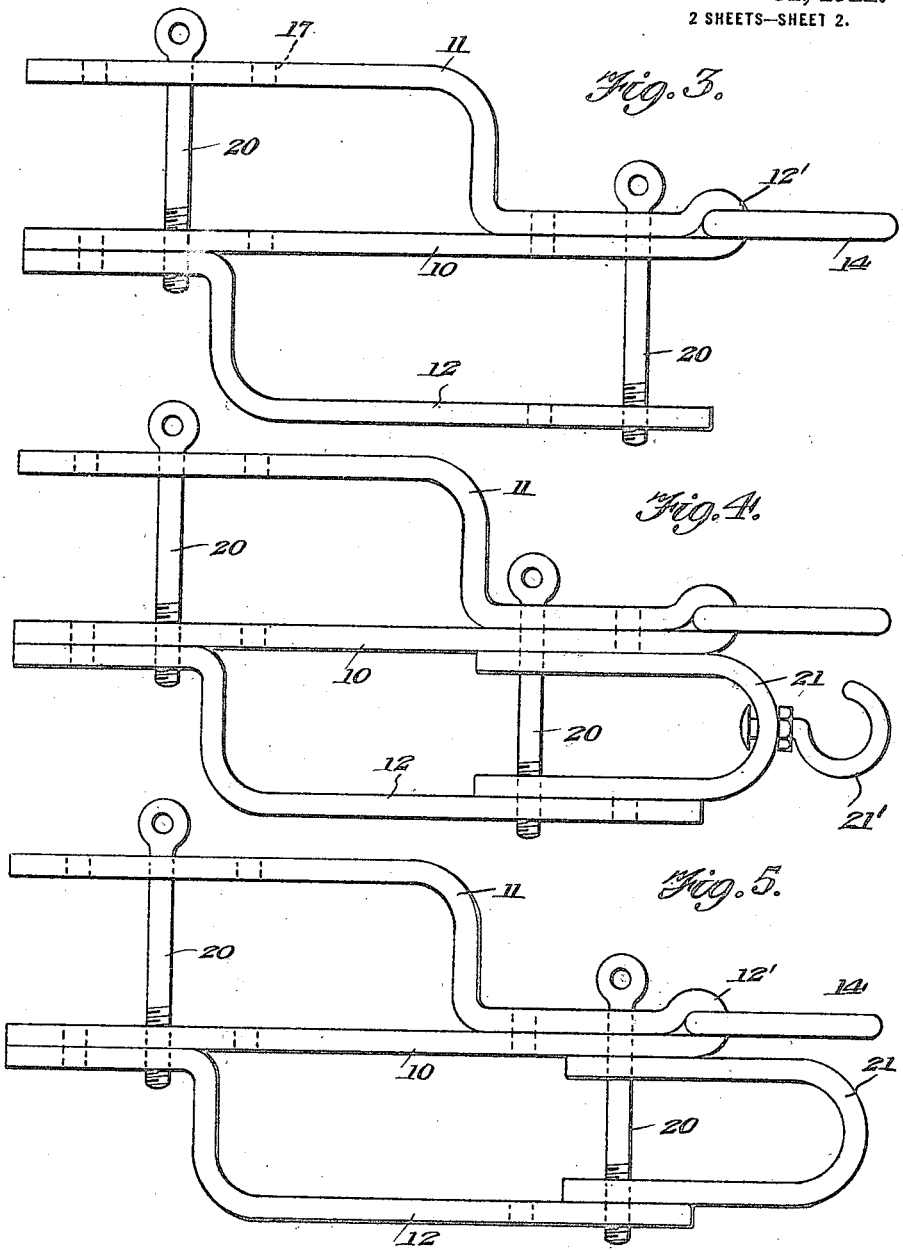

Patented Oct. 31, 1922.

1,434,296

UNITED STATES PATENT OFFICE.

HENRY T. LARSON, OF BECKER, MINNESOTA.

CLEVIS.

Application filed June 15, 1921, Serial No. 477,776. Renewed August 19, 1922. Serial No. 583,036.

*To all whom it may concern:*

Be it known that I, HENRY T. LARSON, a citizen of the United States, residing at Becker, in the county of Sherburne and State of Minnesota, have invented new and useful Improvements in Clevises, of which the following is a specification.

The present invention aims to provide a reversible clevis, primarily intended for use in conjunction with a draft equalizer, the clevis being designed to accommodate equalizers and singletrees of different dimensions by reversing the clevis in a manner to be hereinafter specifically described and pointed out in the claim.

In the drawing forming part of this application, like numerals of reference indicate similar parts in the several views and wherein:—

Figure 1 is a top plan view, showing the clevis associated with an equalizer and singletree.

Figure 2 is a side elevation of the clevis, partly in section.

Figure 3 is a similar view of a modified form.

Figure 4 is a similar view of a further modified form.

Figure 5 is a view similar to Figure 4 with the hook removed.

Figure 6 is a fragmentary side view of a further modified form of the invention.

The clevis forming the subject matter of this invention comprises a base member 10 to the opposed sides of which are secured substantially L-shaped members 11 and 12 respectively, the short branch of each member engaging the adjacent side of the base, while the longer branch of each member is arranged substantially parallel with the base as shown. The member 11 is formed integrally with the base 10 and defines a loop 12' at its point of juncture with the base to accommodate the ring 14. If desired, the entire structure with the exception of the ring, thus far described, may be formed from a single piece of material. The short branch of each member 11 and 12 is provided with a plurality of openings 15 which register with openings 16 in the base, while the long branch of each of the L-shaped members is provided with openings 17. It will be noted that the L-shaped members are oppositely disposed, with the free extremity of one member arranged above the short branch of the other member, and that the openings 17 of the member 11 coincide with the openings 15 and 16 of the base 10 and the short branch of the L-shaped member 12, while the openings 17 of the latter mentioned member coincide with the corresponding part of the member 11. The members 11 and 12 however, vary in size to accommodate equalizer bars 18 of different dimensions.

Arranged between the L-shaped member 11 and the base 10 is a yoke 19 which has openings adapted to be arranged in registration with any of the openings in the said member and base above referred to, so that an adjustment may be made to accommodate the equalizer bars of different size. A retaining pin 20 is passed through said alined openings to hold the yoke 19 associated with the clevis. A similar yoke 21 is associated in the same manner with the L-shaped member 12, and is also susceptible of adjustment, this yoke being slightly larger than the yoke 19. Either of the yokes 19 and 21 is adapted to support a singletree 22.

In the disclosure of the invention as illustrated in Figure 4, a hook 21' is swiveled on the closed end of the yoke 21.

In Figure 6, I have illustrated a further modified form of the invention wherein use is made of a yoke 23 which is swiveled to the yoke 21. Otherwise the construction is same as illustrated in Figure 5.

The manner of using the invention is clearly illustrated in Figures 1 and 2 wherein the equalizer bar 18 is adapted to be positioned between the base 10 and one of the L-shaped members above referred to, the singletree 22 being supported by the yoke associated with the other L-shaped member arranged above the base 10. The clevis is slightly larger on one side than the other, so that it can be reversed for use with equalizer bars and singletrees of different dimensions, the yoke positioned above the base always being employed to support the singletree in the ring 14 accommodating the usual stay chain.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim is:

A reversible clevis comprising a base, L-shaped members secured to the opposed sides of the base and oppositely disposed relatively, the longer branch of each member being arranged substantially parallel with said base, said base and the contracting end of each member being provided with spaced alined openings, and a yoke swiveled between the base and each member and susceptible of adjustment longitudinally of the base, a loop provided at the point of juncture between the base and one of said members, and a ring supported in said loop.

In testimony whereof I affix my signature.

HENRY T. LARSON.